United States Patent [19]

Hickel et al.

[11] Patent Number: 5,580,612

[45] Date of Patent: Dec. 3, 1996

[54] PROCESS FOR PRODUCTION OF LAYER ELEMENT CONTAINING AT LEAST ONE MONOMOLECULAR LAYER OF AN AMPHIPHILIC MOLECULE AND ONE FULLERENE

[75] Inventors: Werner Hickel, Ludwigshafen; Thomas Schindler, Bad Soden am Taunus; Hans-Ulrich Ter Meer, Frankfurt am Main, all of Germany

[73] Assignee: Hoechst Aktiengesellschaft, Germany

[21] Appl. No.: 449,239

[22] Filed: May 24, 1995

Related U.S. Application Data

[62] Division of Ser. No. 101,905, Aug. 4, 1993, abandoned.

[30] Foreign Application Priority Data

Aug. 6, 1992 [DE] Germany ............................ 42 25 962.2

[51] Int. Cl.⁶ ..................................................... B05D 1/20
[52] U.S. Cl. ..................... 427/430.1; 427/407.1; 427/434.3
[58] Field of Search ............................ 427/407.1, 430.1, 427/434.3

[56] References Cited

U.S. PATENT DOCUMENTS

| | | | |
|---|---|---|---|
| 4,960,635 | 10/1990 | Erdelen et al. | 428/220 |
| 5,166,307 | 11/1992 | Cherdron et al. | 528/183 |
| 5,338,571 | 8/1994 | Mirkin et al. | 427/162 |

FOREIGN PATENT DOCUMENTS

| | | |
|---|---|---|
| 0432619 | 6/1991 | European Pat. Off. . |
| 0538864 | 4/1993 | European Pat. Off. . |

OTHER PUBLICATIONS

Langmuir, "Formation of Langmuir–Blodgett Films of a Fullerene", 1992, vol. 8, pp. 4–6.

A. Laschewsky et al., J. Am. Chem. Soc. 1987, 109, pp. 788–796.

*Primary Examiner*—Katherine Bareford
*Attorney, Agent, or Firm*—Curtis, Morris & Safford, P.C.

[57] ABSTRACT

A layer element carries on a base at least one regularly arranged monomolecular layer containing a fullerene and a polymeric amphiphilic compound, in particular a polymethacrylic ester derivative. It is suitable for purposes of nonlinear optics.

6 Claims, 5 Drawing Sheets

PROCESS FOR PRODUCTION OF LAYER ELEMENT CONTAINING AT LEAST ONE MONOMOLECULAR LAYER OF AN AMPHIPHILIC MOLECULE AND ONE FULLERENE

This application is a division of application Ser. No. 08/101,905, filed Aug. 4, 1993, now abandoned.

BACKGROUND OF THE INVENTION

The present invention relates to a layer element containing at least one regularly arranged monomolecular layer of an amphiphilic molecule and one fullerene and to a process for the production of this layer element using the transfer method of Langmuir-Blodgett. This method is described e.g. in European Patent Application 0 432 619 and in U.S. Pat. No. 4,772,856.

It is already known that $C_{60}$-fullerene forms rigid films on water/air interfaces. It is not possible to transfer these films, as is customary in the Langmuir-Blodgett method, to a perpendicularly immersed substrate. It is likely that at least in part multilayers are formed on the water surface. The transfer characteristics of fullerene LB films is improved by mixing the fullerene with the amphiphilic compound icosanoic acid (Takayoshi Nakamura et al, Langmuir 1992, Vol. 8, No. 1). Unfortunately, according to in-house tests with omegatricosenoic acid, the amount of fullerene which can be incorporated in the monomolecular layer is limited to about 50% by weight, and the thermal stability of the films thus produced is low. Owing to their strongly delocalized electron systems, fullerenes exhibit nonlinear optical properties similar to those of conjugated polymers. They have high $\chi(3)$ values which makes them ideally suitable for apparatuses for optical frequency tripling. For fullerene-containing LB layers, this is true all the more, the higher the fullerene content. A certain thermal minimum stability of the layers is necessary if they are to be used more widely.

Accordingly, the object was to describe a process which allows the fullerene content in an LB layer to increase and the thermal stability of such layer systems to improve.

SUMMARY OF THE INVENTION

A process for the production of a layer element has now been found in which a mixture of a fullerene and an amphiphilic compound is spread on a water surface and transferred to a base by the Langmuir-Blodgett method. In this process, the amphiphilic compound used is a polymeric compound, for example polyglutamate and trimethylsilylcellulose. The amphiphilic polymethacrylic acid derivative used is preferably derived from a monomeric methacrylic ester of the formula I

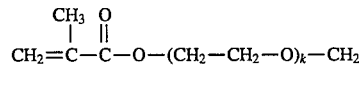 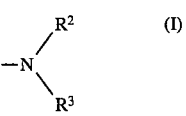 (I)

in which k is an integer from 0 to 10, $R^2$ is a $C_1$–$C_{24}$-alkyl group and $R^3$ is a $C_8$–$C_{24}$-alkyl group with the proviso that the groups $R^2$ and $R^3$ contain a different number of carbon atoms.

DESCRIPTION OF THE PREFERRED EMBODIMENTS

The mixture of fullerene and amphiphilic polymers used preferably contains at least 10% by weight, in particular at least 40% by weight, of fullerene. In the case of polymers derived from monomers of the formula I, preferably 55–70% by weight of fullerene is used for preparing the mixture of amphiphilic polymer and fullerene, so that the monomolecular layers of the layer element also contain at least in part 55–70% by weight of fullerene (balance of polymeric amphiphilic compound). The fullerene used can be the compound $C_{60}$ and/or the compound $C_{70}$.

The invention furthermore relates to a layer element containing at least one regularly arranged monomolecular layer of a fullerene-containing amphiphilic molecule on a free base for layer elements. The composition of a monomolecular layer of the layer element is the same as the composition of the mixture of fullerene and polymeric amphiphilic compounds used for its production. The specific feature of the layer element according to the invention is that the amphiphilic molecule is a polymeric compound, in particular a polymethacrylic ester derivative, preferably a polymer formed by polymerization of I. If its fullerene content is at least 50%, the layer element is suitable for optical frequency-tripling. Increasing fullerene concentration results in a more than linear increase of $\chi(3)$. A high $\chi(3)$ is desirable for optical applications. Suitable layer elements preferably receive at least two fullerene-containing monomolecular layers. Preference is given to at least 50 fullerene-containing layers, preferably to 100–200 of such layers. Suitable bases are any desired solid, preferably dimensionally stable, substrates made of various materials. The substrates serving as bases can, for example, be trsnsparent or not transparent, electrically conducting or insulating. The substrate can be hydrophobic or hydrophilic. The surface of the substrate to which the LB layer is applied can have been made water-repellent. The substrate surface to be coated should be as pure as possible so as not to interfere in the formation of a thin, ordered layer. In particular, the presence of surface-active substances on the substrate surface to be coated can impair the layer production. Before applying the LB films, it is possible to provide the substrate serving as base on the surface to be coated first with an intermediate layer in order to improve, for example, adhesion of the film to the substrate.

Examples of materials which can be used for the substrate are metals such as gold, platinum, nickel, palladium, aluminum, chromium, niobium, tantalum, titanium, steel, and the like. Other suitable materials for the substrates are plastics, such as, for example, polyester, for example polyethylene terephthalate or polybutylene terephthalate, polyvinyl chloride, polyvinylidene chloride, polytetrafluoroethylene, polyethylene or polypropylene.

Likewise, semiconductors, such as silicon or germanium, glass, silicon dioxide, ceramic materials or cellulose products are also suitable materials for the substrates.

If necessary, the surface of glass and other hydrophilic substrates can be made water-repellent in a manner known per se, for example by reaction with alkylsilanes or hexamethyldisilazane. The selection of the substrate materials depends primarily on the intended use of the layer elements produced from the films according to the invention. For optical elements, it is customary to use transparent, light-transmitting substrates as the base. If the layer elements according to the invention are used, for example, in electrical engineering or in electrochemical processes, materials which serve as substrates are in particular electrically conductive materials, such as metals or metallic films, for example on plastic sheets.

Depending on the intended use, the substrates which serve as bases for the films according to the invention can have any desired form. For example, they can be in the form of films, sheets, plates, tapes or else in the form of cylinders or can be selected from any other desired forms. In general, their bases will be flat, planar substrates, such as, for example, films, sheets, plates, tapes, and the like. The substrate surface to be coated is preferably smooth, such as is customary for the production of LB films. In the case of flat, planar substrates, the films according to the invention can be applied to one or both substrate surfaces.

A characteristic feature of the Langmuir-Blodgett method is that water-insoluble molecules (predominantly amphiphilic monomer/polymer substances) are spread from a solution (concentration: 1 mg/ml) on the water surface. The solvent evaporates; an ordered two-dimensional film is built up by compression. Successive immersion of the substrate (e.g. silicon) through the water/air gap interface makes it possible to build up multilayers of defined thickness with a thickness increment of about 2 to 6 nm.

In particular, a mixture of the fullerene and the amphiphilic compound is dissolved in a volatile organic solvent to form a solution, the solution is spread on the water surface, the organic solvent is vaporized, whereby a film remains on the water surface, the film is compressed and transferred onto the solid base by immersing into the water and/or withdrawing from the water the solid base through the water surface containing the film.

Compared with the conventional low-molecular-weight amphiphilic compounds, such as omega-tricosenoic acid or arachidic acid, the polymeric amphiphilic compounds used lead to films having improved transferability, lower defect density and high thermal stability.

The fullerene/polymer mixed layers can be transferred to a substrate in particular by means by the Y coating customary in the LB method.

If the layer elements according to the invention contain a light-transmitting base, they are suitable as optical limiters, since the light transmission in the fullerene layers decreases with increasing light current.

If the layer elements according to the invention comprise an electrically conductive base (for example an ITO layer vapor-deposited on a base), they can be used for the production of light-emitting diodes. After mounting a cover electrode on the uppermost layer and applying a voltage between base and electrode, the fullerene-containing layers can be made to emit electroluminescent radiation.

The invention is illustrated by the examples which follow:

EXAMPLE 1

First, the monomer of the formula I where k is 0 and in which $R^2$ was a n-octadecyl group and $R^3$ an ethyl group was synthesized. Polymer (II) was obtained therefrom by homopolymerization. The formula of II is shown below.

Figure 1:
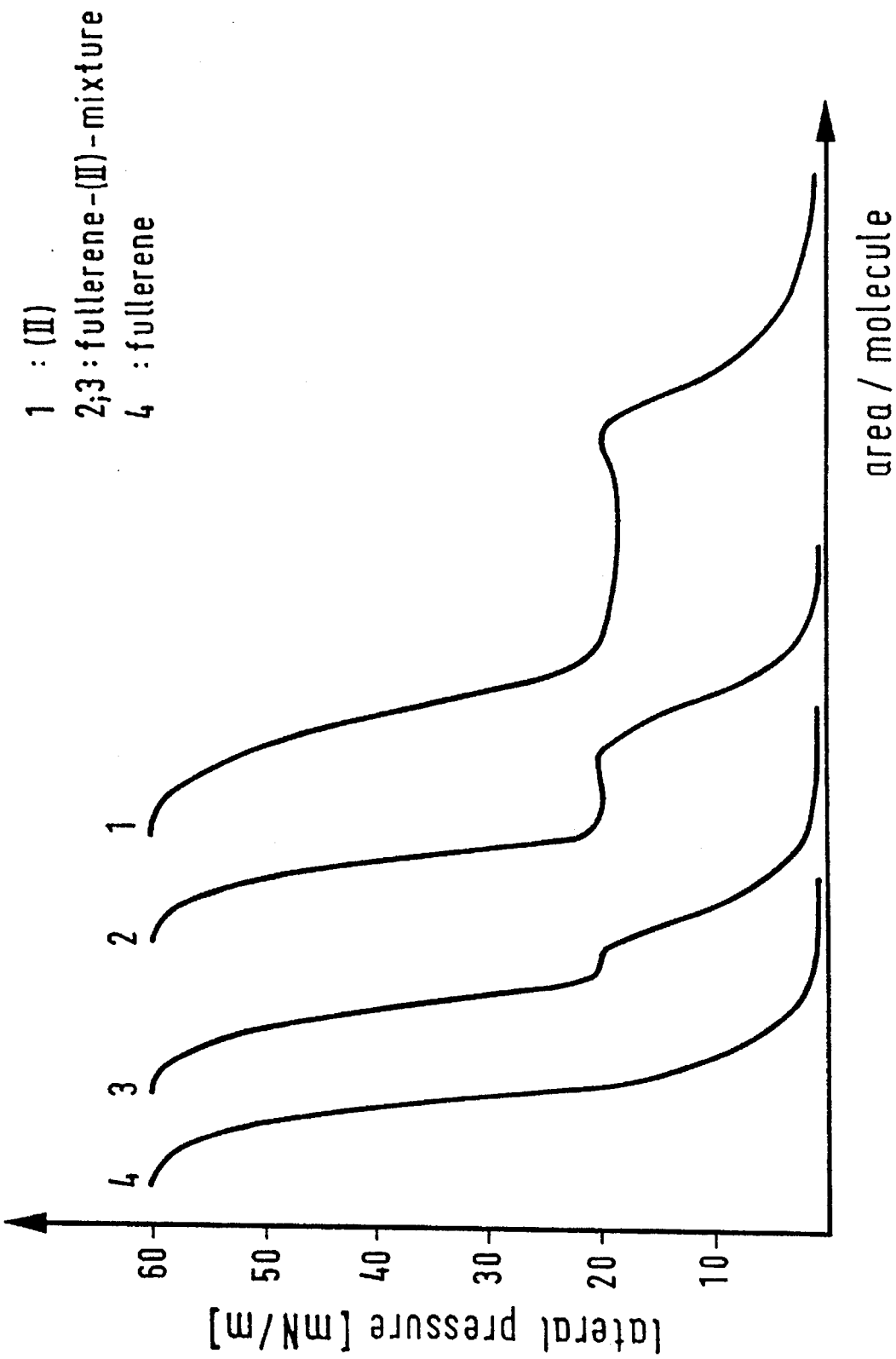
FIG. 1 is a plot of lateral pressure as a function of area/molecule.

FIG. 1 shows the isotherms of mixtures of II with fullerenes (75% by weight of $C_{60}$, 25% by weight of $C_{70}$) in a II-fullerene weight ratio of 3:1 ("2") and 1:1 ("3"). Isotherm 1 is that of the pure compound II, and isotherm 4 is that of pure fullerene. The shape of the isotherms clearly shows the increasing influence of polymer (II) with simultaneously decreasing fullerene content.

EXAMPLE 2

Figure 2:
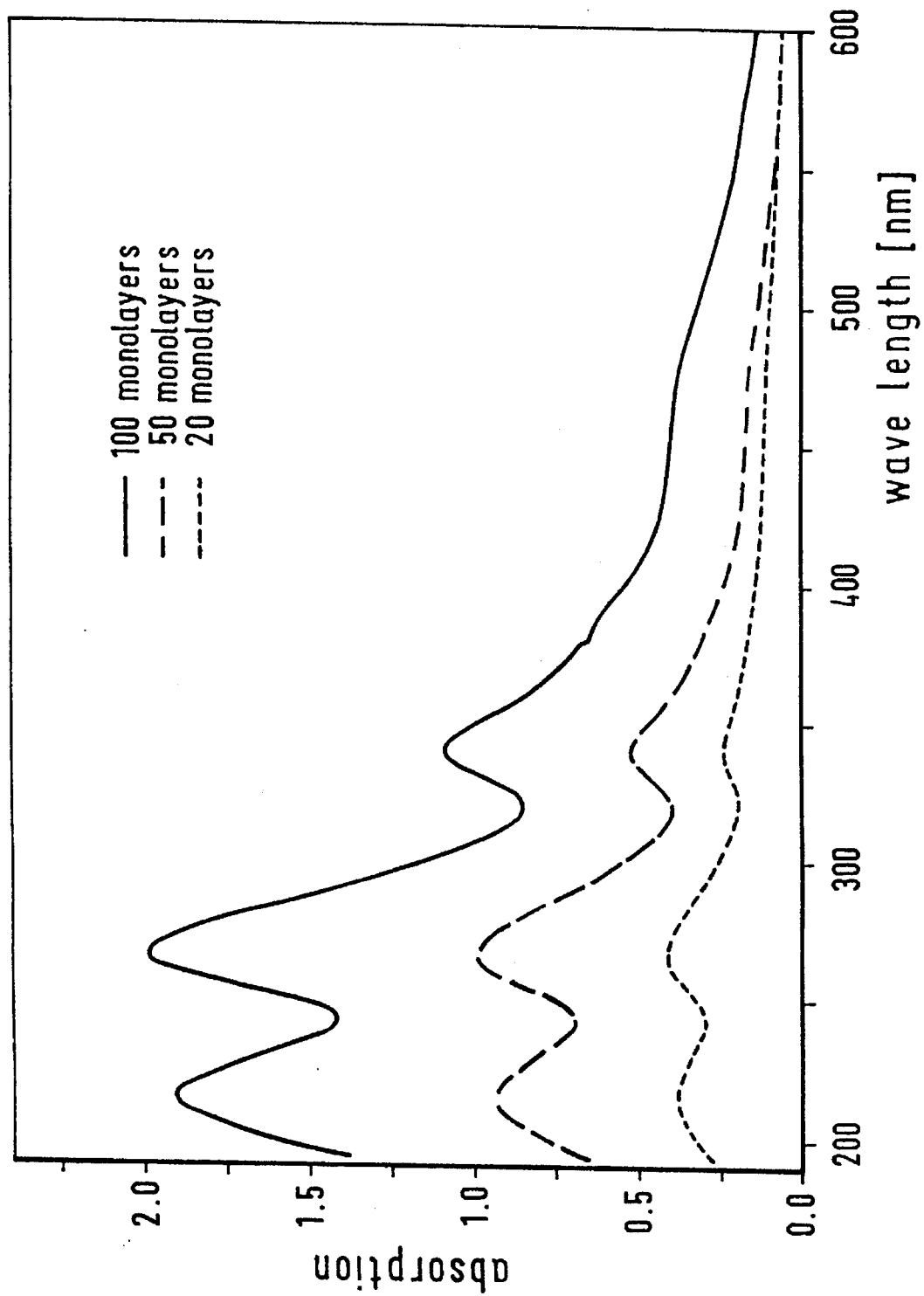
FIG. 2 is a plot of absorption as a function of wave length.

FIG. 2 shows the absorption spectra of a mixed film of the transferred layer comprising 50% by weight of polymer II and 50% by weight of fullerene for various layer thicknesses. The layer thicknesses are 40 nm, 100 nm and 200 nm, which corresponds to 20, 50 and 100 monolayers.

The increase in absorption with increasing thickness is a measure of the coating quality of the multilayer films. There is good fulfillment of the linear relationship between the absorption of all three bands in the UV at 340, 265 and 220 nm and the film thickness. This shows that coating can be carried out reproducibly and the microscopic environment of the fullerene molecules in the LB film remains unchanged with an increasing number of monolayers.

Figure 3:
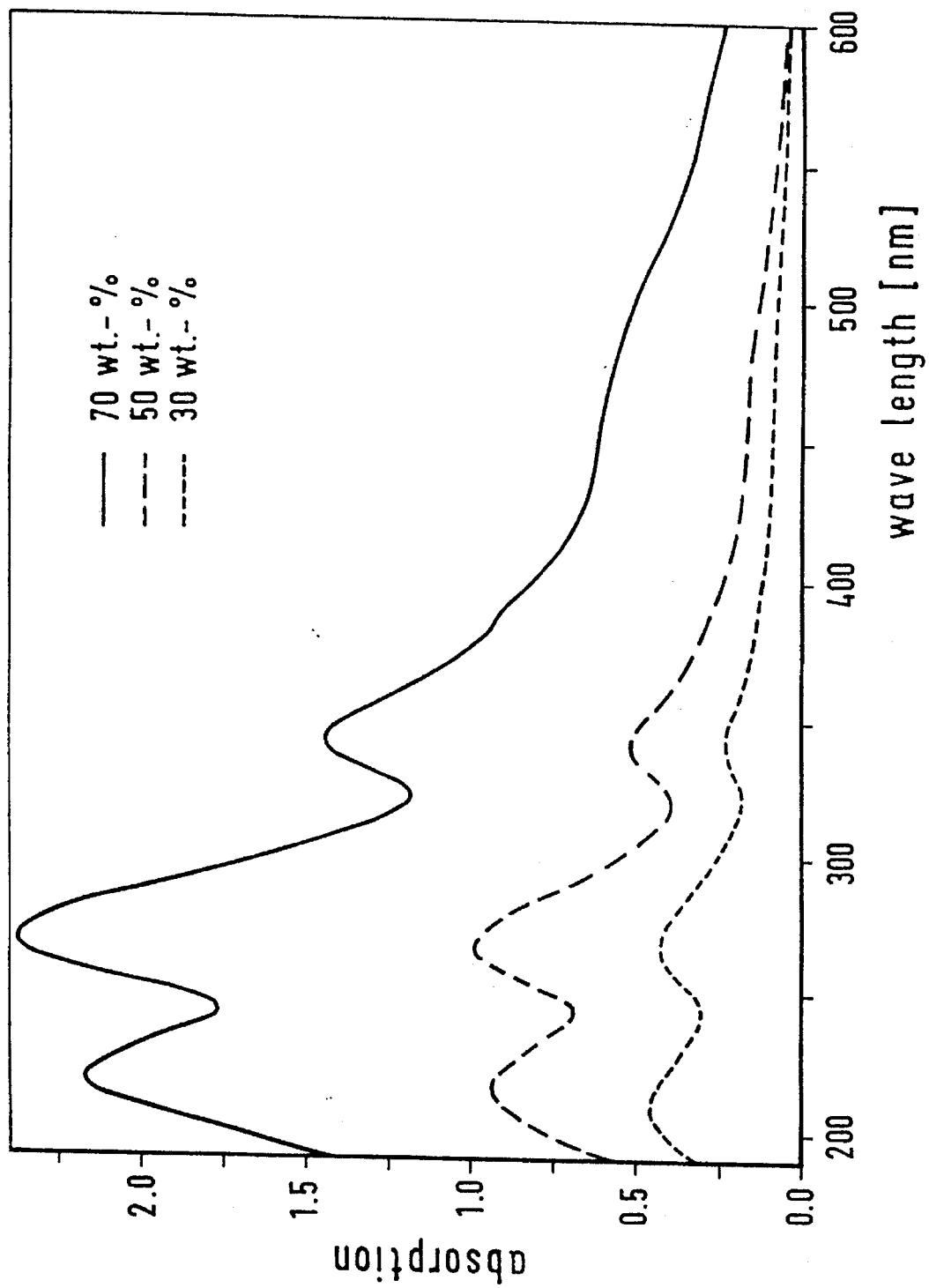
FIG. 3 is a plot of absorption as a function of wave length.

FIG. 3 shows the absorption spectra of a mixed film containing 50 monolayers each for various fullerene concentrations.

Figure 5:
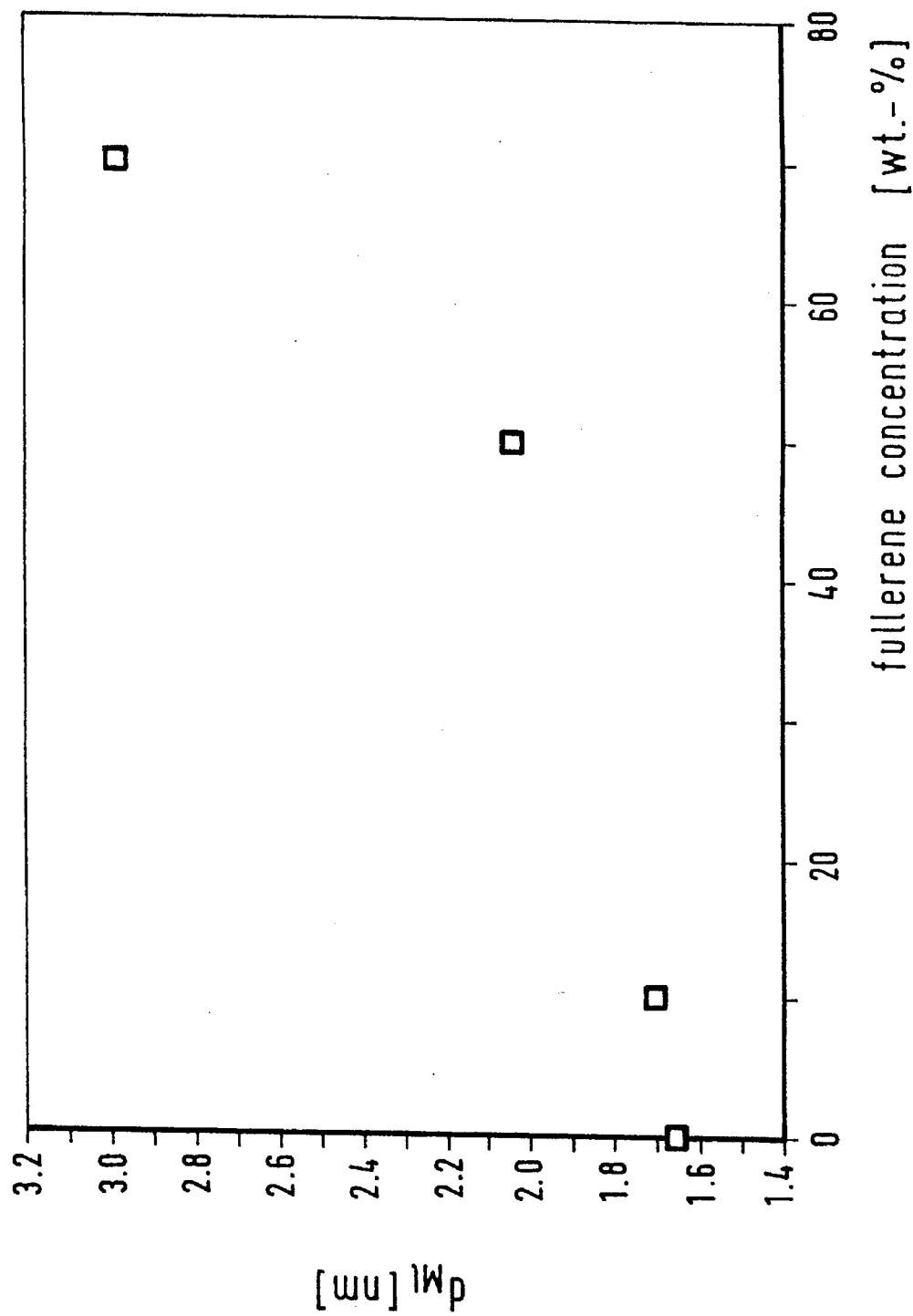
FIG. 5 is a plot of layer thickness as a function of fullerene concentration.

There is a more than linear increase in absorption with increase in fullerene content. This is due to an increase in monolayer thickness with increasing fullerene content. FIG. 5 shows the increase in layer thickness as a function of fullerene concentration determined from measurements of small-angle X-ray scattering.

EXAMPLE 3

Frequency-tripling measurements were carried out on samples having a fullerene content in the transferred layer of 0, 10, 30, 50 and 70% by weight. The balance was composed of polymer II. The fullerene mixture from Example 1 was used. In centrosymmetric materials, such as buckminsterfullerene, induced polymerization is described by $$p = \epsilon_0 \chi^{(3)} E^3$$

in which $\chi^{(3)}$ is the third-order nonlinear susceptibility, E is the electric field applied of the laser pulse and $\epsilon_0$ is the electric field constant. The experimental set up of an apparatus for determining third-order nonlinear susceptibility is known to one skilled in the art, for example from P. N. Prasad, D. J. Williams, Introduction to Nonlinear Optical Effects in Molecules and Polymers, John Wiley, 1991, p. 202.

The harmonic signal was recorded in the transmission mode as a function of the angle of rotation of the sample relative to the beam axis. The parallel reference branch serves for compensating the fluctuations between pulses of the laser intensity. Scaling of the harmonic intensity is effected by measuring the quartz glass substrate without film.

Figure 4:
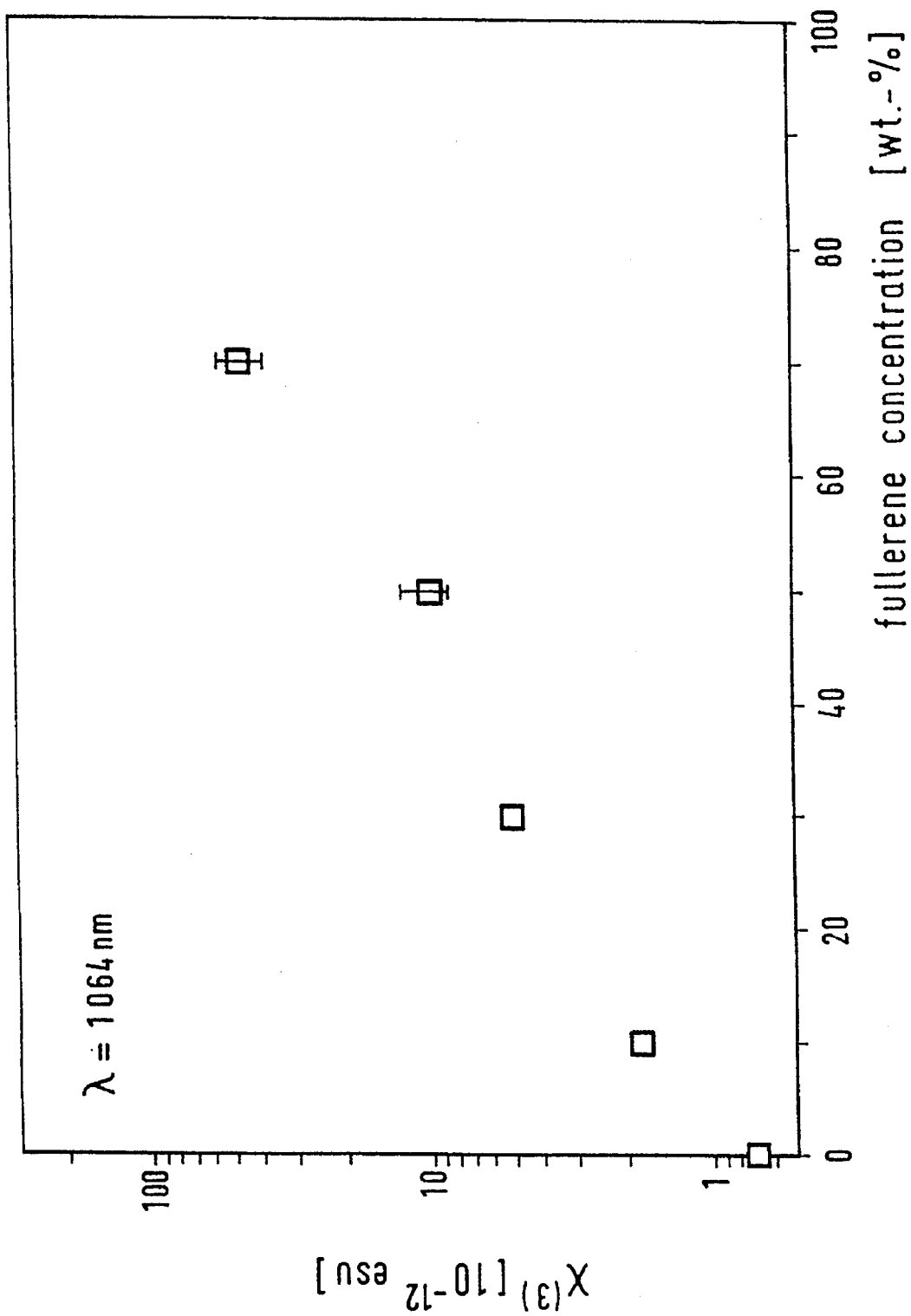
FIG. 4 is a plot of third-order nonlinear susceptibility as a function of fullerene concentration.

For an exact determination of the nonlinear optical susceptibilities, the refractive index at the fundamental and harmonic frequency must be known. The layer thickness was determined by small-angle X-ray scattering. It increases with increasing fullerene content (cf. FIG. 5). Since the refractive indices at 1,064 nm and 154 nm are difficult to determine directly, a Kramers-Kronig analysis was carried out. This method allows the refractive index to be ascertained from the absorption spectrum as long as the refractive index can be determined at a frequency, for example ellipsometrically at 633 nm (balance: Polymer II). FIG. 4 shows the dependence of the $\chi^{(3)}$ coefficient from three-photon resonance on the fullerene content.

The $\chi^{(3)}$ coefficients have an error of about 10% and are, within the margin of error, on a straight line in agreement with the shape of curve expected by theory. Upon extrapolation to 100% by weight, $2\times10^{-10}$ esu are obtained for the $\chi^{(3)}$ value of the pure fullerene layer.

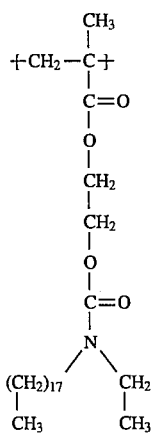

Formula II

What is claimed is:

1. A process for the production of a layer element, in which a mixture of a fullerene and an amphiphilic compound is spread on a water surface and transferred to a solid said base by the Langmuir-Blodgett method, which comprises using an amphiphilic compound that is a polymeric compound.

2. The process as claimed in claim 1, wherein the polymeric compound is a polymethacrylic ester derivative.

3. The process as claimed in claim 2, wherein the polymethacrylic ester derivative is derived from a monomer of the formula I, $$CH_2=\overset{CH_3}{\underset{|}{C}}-\overset{O}{\underset{\|}{C}}-O-(CH_2-CH_2-O)_k-CH_2-CH_2-O-\overset{O}{\underset{\|}{C}}-(CH_2)_2-\overset{O}{\underset{\|}{C}}-N\overset{R^2}{\underset{R^3}{\diagup\hspace{-0.3em}\diagdown}} \quad (I)$$

in which k is an integer from 0 to 10, $R^2$ is a $C_1$–$C_{24}$-alkyl group and $R^3$ is a $C_8$–$C_{24}$-alkyl group, with the proviso that the groups $R^2$ and $R^3$ contain a different number of carbon atoms.

4. The process as claimed in claim 3, wherein the amphiphilic compound used is a polymethacrylic ester derivative derived from a monomer of the formula I and the mixture contains 55–70% by weight of fullerene.

5. The process as claimed in claim 1, wherein a mixture is used which contains at least 40% by weight of fullerene.

6. A process as claimed in claim 1, wherein a mixture of the fullerene and the amphiphilic compound is dissolved in a volatile organic solvent to form a solution, the solution is spread on the water surface, the organic solvent is vaporized, whereby a film remains on the water surface, the film is compressed and transferred onto the solid base by immersing into the water and/or withdrawing from the water the solid base through the water surface containing the film.

* * * * *